United States Patent
Wang et al.

(10) Patent No.: US 12,217,507 B2
(45) Date of Patent: Feb. 4, 2025

(54) VEHICLE MONITORING METHOD AND MONITORING SYSTEM

(71) Applicant: ZHEJIANG UNIVIEW TECHNOLOGIES CO., LTD., Zhejiang (CN)

(72) Inventors: Guozhen Wang, Zhejiang (CN); Ping Xu, Zhejiang (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 345 days.

(21) Appl. No.: 17/911,004

(22) PCT Filed: Dec. 28, 2020

(86) PCT No.: PCT/CN2020/139924
§ 371 (c)(1),
(2) Date: Sep. 12, 2022

(87) PCT Pub. No.: WO2021/184886
PCT Pub. Date: Sep. 23, 2021

(65) Prior Publication Data
US 2023/0102322 A1  Mar. 30, 2023

(30) Foreign Application Priority Data
Mar. 20, 2020 (CN) .......................... 202010200089.1

(51) Int. Cl.
*G06V 20/50* (2022.01)
*G01J 4/04* (2006.01)
(Continued)

(52) U.S. Cl.
CPC ................ *G06V 20/50* (2022.01); *G01J 4/04* (2013.01); *G02B 27/281* (2013.01); *G06T 7/70* (2017.01);
(Continued)

(58) Field of Classification Search
None
See application file for complete search history.

(56) References Cited

U.S. PATENT DOCUMENTS 10,228,571 B2 *  3/2019  Wada ...................... H04N 23/55
10,525,666 B2 *  1/2020  Hayasaki ................. G02B 5/26
(Continued)

FOREIGN PATENT DOCUMENTS

CN  102116997 A  7/2011
CN  102356628 A  2/2012
(Continued)

OTHER PUBLICATIONS

Chinese Office Action in Application No. 202010200089.1 dated Feb. 28, 2022, 13 pages including English Translation.
(Continued)

*Primary Examiner* — Anand P Bhatnagar
(74) *Attorney, Agent, or Firm* — Morgan, Lewis & Bockius LLP (57) ABSTRACT

Provided are a vehicle monitoring method and a vehicle monitoring system. The vehicle monitoring method includes that: a polarization angle of polarized light in a sky image reflected by a vehicle window in a monitoring scenario is calculated, and a light-filtering polarization angle is calculated according to the polarization angle of the polarized light in the sky image reflected by the vehicle window, where the polarized light in the sky image is formed by scattered sunlight in a sky region corresponding to the sky image; the polarized light in the sky image reflected by the vehicle window in the monitoring scenario is filtered out according to the light-filtering polarization angle; and the monitoring scenario is imaged to form a monitoring image.

14 Claims, 4 Drawing Sheets

(51) Int. Cl.
  *G02B 27/28*  (2006.01)
  *G06T 7/70*  (2017.01)
  *G06V 10/36*  (2022.01)

(52) U.S. Cl.
  CPC .... *G06V 10/36* (2022.01); *G06T 2207/10016* (2013.01); *G06T 2207/30244* (2013.01); *G06T 2207/30256* (2013.01); *G06V 2201/08* (2022.01)

(56) References Cited

U.S. PATENT DOCUMENTS

| | | | | |
|---|---|---|---|---|
| 10,812,735 | B2* | 10/2020 | Hirasawa | H04N 23/81 |
| 11,163,977 | B2* | 11/2021 | Yamada | G06V 20/62 |
| 11,294,177 | B2* | 4/2022 | Tanaka | G02B 5/3016 |
| 11,852,783 | B2* | 12/2023 | Taira | B32B 27/306 |
| 11,860,361 | B2* | 1/2024 | Anzai | B60K 35/00 |
| 2006/0023315 | A1* | 2/2006 | Robinson | G02B 5/305 |
| | | | | 359/630 |
| 2008/0252882 | A1* | 10/2008 | Kesterson | G02B 27/28 |
| | | | | 356/300 |
| 2012/0162961 | A1* | 6/2012 | Brandt | B60J 3/06 |
| | | | | 362/19 |
| 2017/0234976 | A1 | 8/2017 | Grauer et al. | |
| 2018/0349679 | A1* | 12/2018 | Rozploch | G06V 40/161 |

FOREIGN PATENT DOCUMENTS

| | | | |
|---|---|---|---|
| CN | 102998667 | A | 3/2013 |
| CN | 105181145 | A | 12/2015 |
| CN | 105516555 | A | 4/2016 |
| CN | 106353952 | A | 1/2017 |
| CN | 107592465 | A | 1/2018 |
| CN | 107607905 | A | 1/2018 |
| CN | 107688244 | A | 2/2018 |
| CN | 108900754 | A | 11/2018 |
| CN | 109164590 | A | 1/2019 |
| CN | 109374130 | A | 2/2019 |
| JP | 2011013965 | A | 1/2011 |
| JP | 2011165004 | A | 8/2011 |
| WO | WO2020/021311 | A1 | 1/2020 |

OTHER PUBLICATIONS

Chinese Office Action in Application No. 202010200089.1 dated Aug. 15, 2022, 8 pages including English Translation.
Liu, et al., "Design of Combined Interference Filter with Transmission Ratio Difference Unrelated to Polarization", Semiconductor Optoelectronics, vol. 31, No. 2, Apr. 2010, China Academic Journal Electronic Publishing House, http://www.cnki.net, 1994-2016, 5 pages, including English Translation.
International Search Report in Application No. PCT/CN2020/139924, dated Mar. 25, 2021, 4 pages including English translation.
European Search Report in Application No. 20925156.0, dated Mar. 18, 2024, 8 pages.
Fujikake et al., "Video Camera System Using Liquid-Crystal Polarizing Filter To Reduce Reflected Light", IEEE Transactions on Broadcasting, IEEE Service Center, Piscataway, NJ, US, vol. 44, No. 4, Dec. 1, 1998, pp. 419-426.

* cited by examiner

VEHICLE MONITORING METHOD AND MONITORING SYSTEM

CROSS REFERENCE TO RELATED APPLICATIONS

The present application is a national stage application filed under 35 U.S.C. 371 based on International Patent Application No. PCT/CN2020/139924, filed on Dec. 28, 2020, which claims priority to Chinese Patent Application No. 202010200089.1, filed with the China National Intellectual Property Administration (CNIPA) on Mar. 20, 2020, the disclosures of which are incorporated herein by reference in their entireties.

TECHNICAL FIELD

Embodiments of the present application relate to video monitoring technologies, and for example, to a vehicle monitoring method and a monitoring system.

BACKGROUND

In the related art, a video monitoring of some scenarios including roads generally needs to monitor a vehicle, when the vehicle is monitored, a vehicle window may reflect strong light, and according to an inclination angle of the vehicle window, an image reflected by the vehicle window is generally a sky image, namely, light provided by a sky region corresponding to the sky image is incident into a camera of a monitoring system after being reflected by the vehicle window, so that a condition inside the vehicle cannot be obtained.

At present, a monitoring scheme for eliminating a reflection of the vehicle window mainly includes two types: 1, a dual-optical-path camera system; and 2, a short-wave infrared camera system. A basic principle of the dual-optical-path camera system is that light acquired by a lens is subjected to a wavelength separation through a light splitter, visible light information and infrared light information are acquired through image sensors, respectively, the visible light information provides color information of an image, and the infrared light information provides contour information of the image. The infrared light is generally not easy to reflect on a surface of the vehicle window and may directly transmit through the vehicle window, and then the elimination of the reflection on the vehicle window and acquisition of the environment in the vehicle are achieved through an image fusion algorithm. A basic principle of the short-wave infrared system is to utilize a camera to collect infrared information to realize the purposes of eliminating the reflection of the vehicle window and shooting through the vehicle window by means of supplementing light through an infrared laser.

However, the dual-optical-path camera system requires two sets of image sensors, so that an optical structure of the camera in the monitoring system is complex, and thus the cost is improved. The short-wave infrared system can only acquire black-and-white images and cannot obtain color images.

SUMMARY

The present application provides a vehicle monitoring method and a vehicle monitoring system so as to effectively reduce the influence generated by a reflection of the vehicle window and simplify an optical structure of a vehicle monitoring system.

In a first aspect, an embodiment of the present application provides a vehicle monitoring method. The method includes that: a polarization angle of polarized light in a sky image reflected by a vehicle window in a monitoring scenario is calculated, and a light-filtering polarization angle is calculated according to the polarization angle of the polarized light in the sky image reflected by the vehicle window, where the polarized light in the sky image is formed by scattered sunlight in a sky region corresponding to the sky image; the polarized light in the sky image reflected by the vehicle window in the monitoring scenario is filtered out according to the light-filtering polarization angle; and the monitoring scenario is imaged to form a monitoring image.

In a second aspect, an embodiment of the present application further provides a vehicle monitoring system. The vehicle monitoring system includes a light-filtering polarization angle calculation system, a polarization light-filtering system, and an imaging system. The light-filtering polarization angle calculation system is configured to calculate a polarization angle of polarized light in a sky image reflected by a vehicle window in a monitoring scenario, and calculate a light-filtering polarization angle according to the polarization angle of the polarized light in the sky image reflected by the vehicle window, where the polarized light in the sky image is formed by scattered sunlight in a sky region corresponding to the sky image. The polarization light-filtering system is configured to filter out the polarized light in the sky image reflected by the vehicle window in the monitoring scenario according to the light-filtering polarization angle. The imaging system is configured to image the monitoring scenario to form a monitoring image.

DETAILED DESCRIPTION

Figure 1:
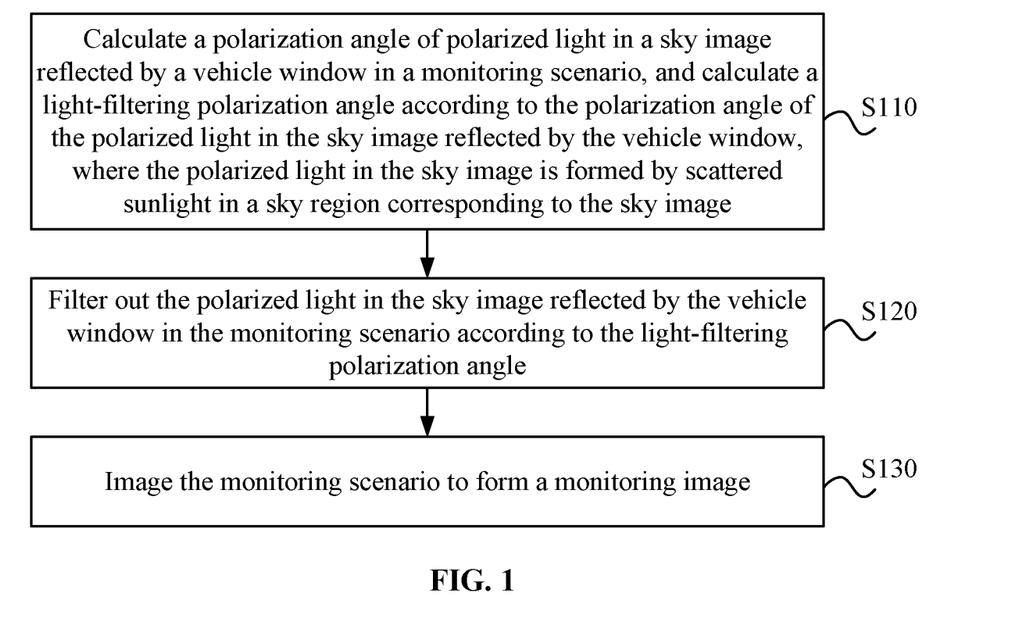
FIG. 1 is a flowchart of a vehicle monitoring method provided in an embodiment of the present application.

FIG. 1 is a flowchart of a vehicle monitoring method provided in an embodiment of the present application, and referring to FIG. 1, the vehicle monitoring method includes S110 to S130.

In S110, a polarization angle of polarized light in a sky image reflected by a vehicle window in a monitoring scenario is calculated, and a light-filtering polarization angle is calculated according to the polarization angle of the polarized light in the sky image reflected by the vehicle window, where the polarized light in the sky image is formed by scattered sunlight in a sky region corresponding to the sky image.

Figure 2:
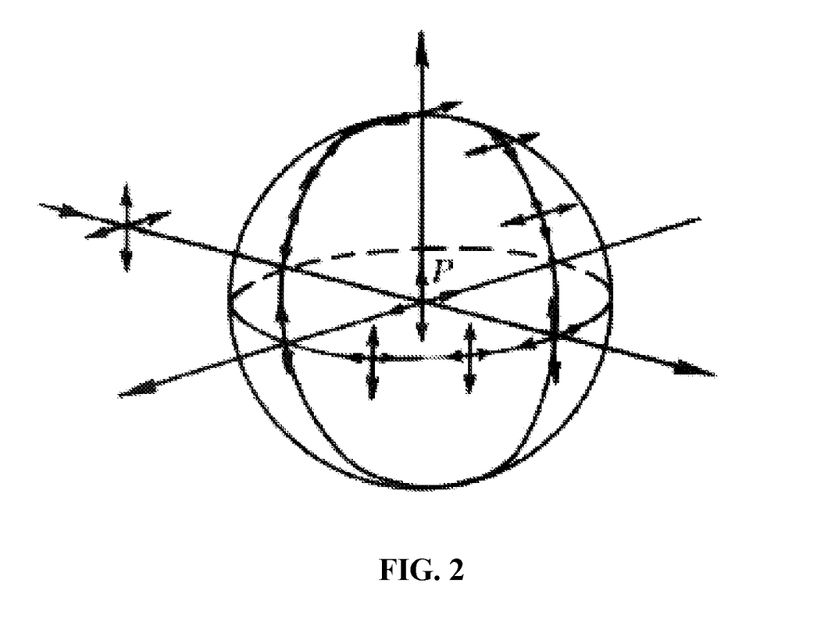
FIG. 2 is a schematic diagram of a scattering polarization of natural light provided in an embodiment of the present application.

FIG. 2 is a schematic diagram of a scattering polarization of natural light provided in an embodiment of the present application, and referring to FIG. 2, firstly, it is understandable that a beam of natural light after being scattered will form scattered light that propagates in various directions. According to the Rayleigh scattering principle of the sky, sunlight is scattered in the sky region corresponding to the sky image reflected by the vehicle window, and scattered light formed by the sunlight in the sky region at a certain position is linearly polarized light.

When the linearly polarized light is incident on the vehicle window, the linearly polarized light enters a camera of a monitoring system through a reflection, so that the sky image is formed. A main polarization direction of the linearly polarized light in the sky image is obtained through a calculation, the linearly polarized light in this direction may be filtered through an optical means, that is, a light-filtering polarization angle may be obtained through a calculation after the polarization angle of the polarized light in the sky image is obtained. In order to ensure the light-filtering effect, optionally, the light-filtering polarization angle is perpendicular to the polarization angle of the polarized light in the sky image.

In S120, the polarized light in the sky image reflected by the vehicle window in the monitoring scenario is filtered out according to the light-filtering polarization angle.

After the light-filtering polarization angle is obtained in the above steps, a polarizer is arranged with the light-filtering polarization angle as a light transmission axis, a light transmission in the light-filtering polarization angle can be realized, so that the polarized light in the sky image is filtered out, and thus the sky image formed on the vehicle window can be effectively weakened.

In S130, the monitoring scenario is imaged to form a monitoring image.

After the polarized light in the sky image is filtered out, remaining light in the monitoring scenario forms a monitoring image upon entering the camera of the vehicle monitoring system. Moreover, since the remaining light in the monitoring scenario includes light transmitted through the vehicle window, the scenario inside the vehicle can be effectively imaged by means of part of light transmitted through the vehicle window, so that a condition inside the vehicle may be conveniently known, and thus the effect of the vehicle monitoring is realized. It needs to be noted that when the polarized light in the sky image is filtered out, other light with the same polarization direction in scenario light is filtered out at the same time, and the monitoring image is formed by light with other polarization directions in the scenario.

According to the vehicle monitoring method provided in the embodiment of the present application, the polarization angle of the polarized light in the sky image reflected by the vehicle window in the monitoring scenario is calculated, and the light-filtering polarization angle is calculated according to the polarization angle of the polarized light in the sky image reflected by the vehicle window, then the polarized light in the sky image reflected by the vehicle window in the monitoring scenario is filtered out according to the light-filtering polarization angle, and finally, the monitoring scenario is imaged to form the monitoring image, so that the monitoring image including the vehicle may be effectively and clearly acquired. According to the embodiments of the present application, a condition that the monitoring system in the related art cannot eliminate the reflection of the vehicle window is avoided, the light reflected by the vehicle window is effectively filtered, and the interior of the vehicle may be effectively imaged, so that external and internal conditions of the vehicle may be monitored, and thus the comprehensive monitoring of the vehicle is ensured.

According to the Rayleigh scattering law, under an application scenario of the vehicle monitoring, the polarization direction of the polarized light in the sky image reflected by the vehicle window is perpendicular to an incident direction of sunlight and a propagation direction of the polarized light. Based on the principle, an embodiment of the present application further provides a method for calculating the polarization angle of the polarized light in the sky image reflected by the vehicle window in the monitoring scenario.

In step S110, the polarization angle of the polarized light in the sky image reflected by the vehicle window in the monitoring scenario is calculated. The step S110 includes S111 to S113.

In S111, an incident angle of the sunlight is determined.

Since the polarization direction of the polarized light in the sky image reflected by the vehicle window is perpendicular to the incident direction of the sunlight and the propagation direction of the polarized light, the incident angle of the sunlight needs to be determined firstly, and the incident angle of the sunlight may be represented by two parameters, i.e., a solar altitude angle and a solar azimuth angle.

In S112, an incident angle of scattered sunlight formed in the sky region corresponding to the sky image is determined.

Meanwhile, scattered light is formed in the sky region corresponding to the sky image reflected by the vehicle window after sunlight is incident, part of the scattered light is incident to the vehicle window and reflected to the camera in the vehicle monitoring system, and a propagation direction of the scattered light can be known by determining the incident angle of the scattered light formed in the sky region corresponding to the sky image.

In S113, a polarization angle of the polarized light formed by the scattered sunlight in the sky region corresponding to the sky image is calculated, and the polarization angle of the polarized light in the sky image is determined.

In the above, after the incident angle of the sunlight and the propagation direction of the scattered light formed in the sky region are obtained, the polarization angle of the polarized light in the sky image can be obtained through a calculation by using a vertical relationship between a polarization angle of scattered light (also referred to as scattered sunlight) in the sky region and the incident angle of the sunlight and a vertical relationship between the polarization angle of scattered light in the sky region and the propagation direction of the scattered light, respectively.

Figure 3:
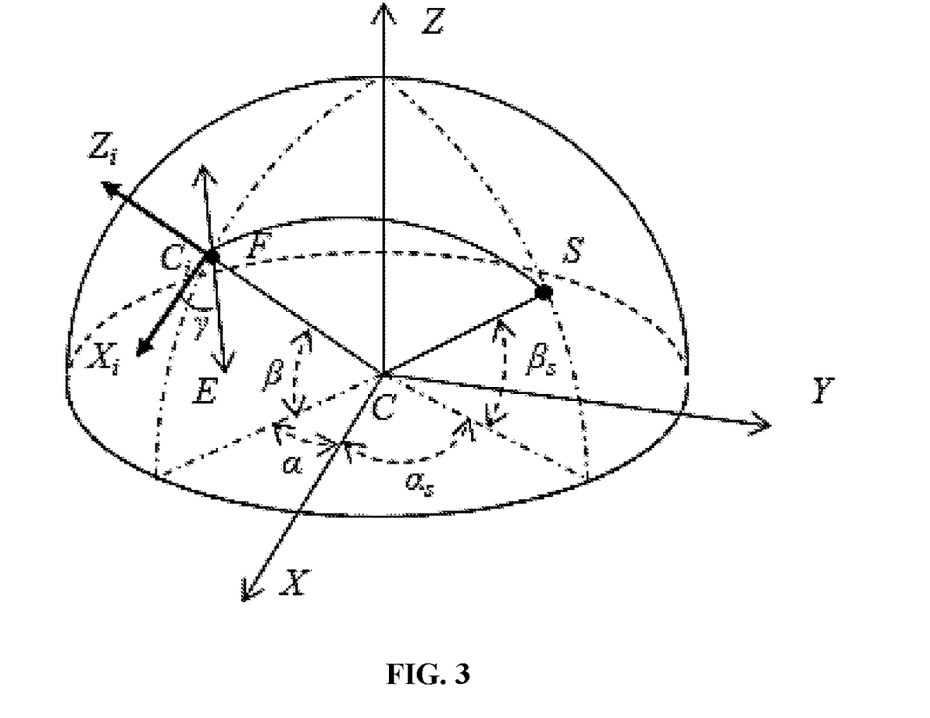
FIG. 3 is a diagram of a model for calculating a polarization angle of polarized light in a sky image provided in an embodiment of the present application.

FIG. 3 is a diagram of a model for calculating a polarization angle of polarized light in a sky image provided in an embodiment of the present application, and a calculation principle of polarized light in a sky image formed on a vehicle window is described in detail using the calculation model shown in FIG. 3. Firstly, as shown in FIG. 3, a point C is set to represent the vehicle window, and a first coordinate system is established with the point C as an origin. An X-axis is a longitude direction, a Y-axis is a latitude direction, a Z-axis is a direction perpendicular to a ground plane, F represents a sky region corresponding to a sky image reflected by the vehicle window, and a direction vector SC represents incident light of sunlight. As may be seen from the polarization scattering principle shown in FIG. 2, when sunlight is incident to a sky region F point, a Rayleigh scattering occurs, scattered light propagated along a direction vector $\overrightarrow{FC}$ is polarized light, and a polarization angle of the polarized light is perpendicular to $\overrightarrow{SC}$ and $\overrightarrow{FC}$ at the same time, so that the polarization angle of the polarized light in the sky image can be obtained through a calculation. Exemplarily, as shown in FIG. 3, it is known that a solar altitude angle is $\beta_s$ and the solar azimuth angle is $\alpha_s$. Thus, it may be known that a direction vector $\overrightarrow{CS}$ may be represented as [cos $\beta_s$ cos $\alpha_s$, cos $\beta_s$ sin $\alpha_s$, sin $\beta_s$]. Similarly, when the altitude angle $\beta$ and the azimuth angle $\alpha$ of a sky observation direction are determined, a direction vector $\overrightarrow{CF}$ of scattered light of the sky region F may be known to be [cos $\beta$ cos $\alpha$, cos $\beta$ sin $\alpha$, sin $\beta$]. Finally, a polarization direction FE of polarized light incident from the sky region F point to a vehicle window C point may be obtained using vector cross multiplication, namely:

$$\overrightarrow{FE} = \overrightarrow{CS} \times \overrightarrow{CF} = [\cos\beta_s\cos\alpha_s, \cos\beta_s\sin\alpha_s, \sin\beta_s] \times [\cos\beta\cos\alpha, \cos\beta\sin\alpha, \sin\beta] = [\cos\beta_s\sin\alpha_s\sin\beta - \sin\beta_s\cos\beta\sin\alpha,$$
$$\sin\beta_s\cos\beta\cos\alpha - \sin\beta\cos\beta_s\cos\alpha_s, \cos\beta_s\cos\beta\sin(\alpha - \alpha_s)].$$

In conclusion, the polarization direction $\overrightarrow{FE}$ of the polarized light can be obtained through a calculation, and when the polarized light in the vehicle window is filtered, it will be achieved by merely filtering polarized light with the polarization direction $\overrightarrow{FE}$.

An embodiment of the present application further provides a measuring and calculating method for calculating the an incident angle of sunlight and a position of the sky region corresponding to the sky image reflected by the vehicle window in a process of calculating the polarization angle of the polarized light described above. Step S111 in which the incident angle of the sunlight is determined includes S1111 to S1113.

In S1111, current time is acquired.

In S1112, a geographic position where a vehicle monitoring system is located is acquired.

In S1113, the incident angle of the sunlight is determined according to pre-established mapping relations between a time parameter and the incident angle of the sunlight and between a geographic position parameter and the incident angle of the sunlight.

An incident angle of sunlight at a certain position is related to time and the geographic position at the same time, so that a database may be established between the incident angle (solar altitude angle $\beta_s$ and solar azimuth angle as) of the sunlight and the current time t and the current geographic position (longitude x and latitude y), that is, the mapping relations between the incident angle of the sunlight and the current time and between the incident angle of the sunlight and the longitude and latitude are established, i.e., F (x, y, t)=($\alpha_s$, $\beta_s$), the incident angle of the sunlight may be determined through the mapping relation by determining the current time and the geographic position of the vehicle monitoring system. Exemplarily, the current time t may be determined using a clock system, a current longitude and latitude (x, y) of the vehicle monitoring system may be determined using a global positioning system (GPS), and thus a local current solar altitude angle $\beta_s$ and a local current solar azimuth angle $\alpha_s$ as may be determined.

As described above, the incident angle of the sunlight may be obtained according to the natural law of geography, and for a direction vector of scattered light of the sky region corresponding to the sky image reflected by the vehicle window, an included angle between a current road direction and the longitude and an inclination angle of the vehicle window relative to a local ground need to be determined, a position of a camera in the vehicle monitoring system needs to be determined, and the direction vector of the scattered light of the sky region is determined by utilizing the light reflection principle. In the embodiments of the present application, the step S112 of determining the incident angle of the scattered sunlight formed in the sky region corresponding to the sky image may include S1121 to S1124.

In S1121, a pitch angle of the vehicle window is determined.

In S1122, a direction angle of the vehicle window is determined.

In S1123, a position of a camera in a vehicle monitoring system relative to the vehicle window is determined.

In S1124, the incident angle of the scattered sunlight formed in the sky region corresponding to the sky image is determined according to the pitch angle of the vehicle window, the direction angle of the vehicle window, and the position of the camera in the vehicle monitoring system relative to the vehicle window.

The pitch angle of the vehicle window and the direction angle of the vehicle window substantially represent a direction of a perpendicular line of the vehicle window, and an incident angle of scattered light from the sky region may be obtained through a calculation according to the direction of the vertical line of the vehicle window and the relative position of the camera in the vehicle monitoring system, i.e., according to the light reflection principle that the reflection angle is equal to the incident angle, and a polarization angle of the scattered light of the sky region may be obtained through a calculation according to the formula $\overrightarrow{FE}=\overrightarrow{CS}\times\overrightarrow{CF}$.

Considering that the position of the camera in the vehicle monitoring system relative to the vehicle window requires simultaneous determination of a position of the camera and a position of the vehicle, including an orientation, a relative height and a relative distance of the camera to the vehicle, there is a need for an accurate stereotactic positioning of positions of the vehicle and the camera. Since a camera in a monitoring scenario imaging end has a certain depth of field, the imaging is a clear imaging of a scenario at a certain distance, that is, the camera substantially clearly images an image at a certain distance, and does not only acquire the image of a vehicle at a specific position. Moreover, the position of the camera and the position of the vehicle cannot be accurately obtained because the vehicle is generally in a driving state and the position of the vehicle is difficult to accurately position. To simplify a calculation process, a reasonable approximation may be made when determining the incident angle of scattered light formed by the sky region corresponding to the sky image. Based on this, an embodiment of the present application further provides a method for determining the incident angle of the scattered light formed in the sky region corresponding to the sky image, and the method includes S1121 to S2124.

In S1121, a pitch angle of the vehicle window is determined.

In S1122, a direction angle of the vehicle window is determined.

In S2123, an incident angle of scattered sunlight formed in a sky region directly opposite the vehicle window is determined according to the pitch angle of the vehicle window and the direction angle of the vehicle window.

In S2124, the incident angle of the scattered sunlight formed in the sky region directly opposite the vehicle window is determined as the incident angle of the scattered sunlight formed in the sky region corresponding to the sky image.

Figure 4:
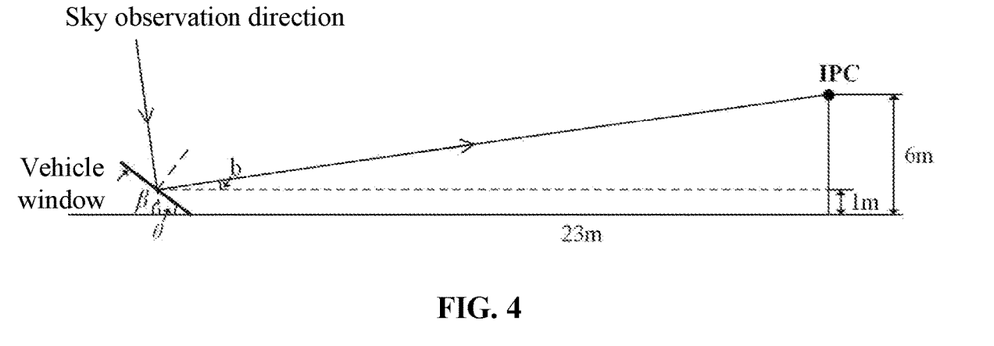
FIG. 4 is a diagram of a model for calculating an altitude angle of a sky observation direction provided in an embodiment of the present application.

The sky region reflected by the vehicle window may be obtained by an IP Camera (IPC), for example, the sky region reflected by the vehicle window may be obtained based on a position of the IPC, the pitch angle of the vehicle window, and a relative position of the window and the IPC. FIG. 4 is a diagram of a model for calculating an altitude angle of a sky observation direction provided in an embodiment of the present application, referring to FIG. 4, and the incident angle (altitude angle β and direction angle α) of scattered light formed by the sky region reflected by the vehicle window may be determined through the pitch angle θ of the vehicle window and an included angle α between a current vehicle driving direction and the longitude. Generally, in a road traffic, the IPC has a height of 6 meters from the ground, and a common shooting distance is 23 meters, so that an included angle b between an IPC shooting direction and the ground is about 12.26°. According to a model for calculating an altitude angle of a sky observation direction reflected by the vehicle window, the altitude angle of the sky observation direction may be obtained through a calculation according to the pitch angle θ of the vehicle window and the included angle b between the IPC shooting direction and the ground, i.e., β=2θ+b; the azimuth angle α may be obtained by an included angle between a current road vehicle driving direction and the longitude, so that the polarization angle of the scattered light of the sky region may be obtained through a calculation according to the formula $\vec{FE}=\vec{CS}\times\vec{CF}$.

Referring to FIG. 3, since the polarization angle is an included angle between an incident light polarization direction (a vector direction of the electric field E) and an incident light coordinate system, an incident light coordinate system is established with the F point as the origin and $\vec{CF}$ as the Zi axis. An included angle between the incident light polarization direction $\vec{FE}$ and the horizontal coordinate Xi of the incident light coordinate system may be obtained by simply converting the $\vec{FE}$ from the first coordinate system to the incident light coordinate system, and that is, a polarization angle of polarized light at the F point in the sky region may be determined. The coordinate conversion matrix Ti may be represented as follows according to the coordinate conversion principle.

$$T_i = \begin{bmatrix} \sin\beta & 0 & -\cos\beta \\ 0 & 1 & 0 \\ \cos\beta & 0 & \sin\beta \end{bmatrix} \times \begin{bmatrix} \cos\alpha & \sin\alpha & 0 \\ -\sin\alpha & \cos\alpha & 0 \\ 0 & 0 & 1 \end{bmatrix}$$

A polarization direction $FE_i$ in the incident light coordinate system is:

$$FE_i = T_i \times FE = \begin{bmatrix} \sin(\alpha_s - \alpha)\cos\beta_s \\ \sin\beta_s\cos\beta - \sin\beta\cos\beta_s\cos(\alpha - \alpha_s) \\ 0 \end{bmatrix}$$

Therefore, an included angle between the polarization direction and the incident light coordinate $X_i$ axis may be obtained, that is, a polarization angle γ of the current incident light is:

$$\gamma = \tan^{-1}\left(\frac{\sin\beta_s\cos\beta - \sin\beta\cos\beta_s\cos(\alpha - \alpha_s)}{\sin(\alpha_s - \alpha)\cos\beta_s}\right)$$

When the polarizer is disposed, a transmission axis of the polarizer needs to be set to have an angle of (γ+90°) with the Xi axis, so that the light-filtering can be realized.

The step S1121 of acquiring the pitch angle of the vehicle may be implemented by steps S11211 to S11213.

In S11211, an image of a vehicle is acquired.

In S11212, a style of the vehicle is recognized according to the image of the vehicle.

In S11213, the pitch angle of the vehicle window is determined according to a pre-established mapping relation between the style of the vehicle and the pitch angle of the vehicle window.

An inclination angle of the vehicle window of a fixed vehicle model is fixed, and after a database is established according to a correspondence between the pitch angle of the vehicle window and the style of the vehicle, a mapping relation between the style of the vehicle and the pitch angle of the vehicle window can be obtained. Through an image recognition, the style of the vehicle may be determined, and further the pitch angle of the vehicle window can be determined. The style of the vehicle may be obtained mainly according to the outline, identification and the like of the vehicle recognized by an image, and it can be realized by adopting the related art by those skilled in the art, and the description is not provided herein. It should be noted that in an image recognition process, a camera of the vehicle monitoring system may be used for imaging a vehicle image in advance so as to recognize the style of the vehicle.

Similarly, for acquiring the direction angle of the vehicle window, an embodiment of the present application further provides a method. Exemplarily, the step S1122 of acquiring the direction angle of the vehicle window includes S11221 to S11222.

In S11221, an orientation of a road where a vehicle is located is acquired, and an orientation of the vehicle is determined.

In S11222, an azimuth angle of the vehicle window is determined according to the orientation of the vehicle.

One camera may be provided on each side of the road in the vehicle monitoring system, an orientation of a road where the vehicle is located in a scenario monitored by the vehicle monitoring system is obtained through positioning of the two cameras, for example, the two cameras may be arranged to be symmetrical about the road, and a direction of a perpendicular bisector of a connecting line of the two cameras is the orientation of the road, so that the orientation of the vehicle can be determined. The orientation of the vehicle represents an orientation of the vehicle window, that is, the azimuth angle of the vehicle window may be determined.

Figure 5:
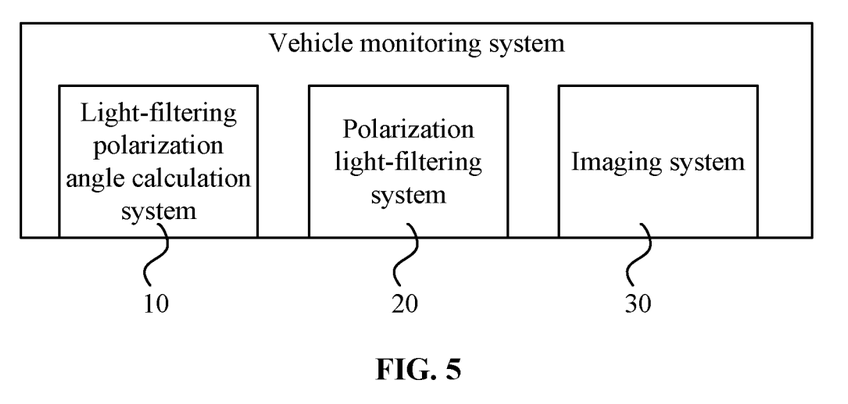
FIG. 5 is a schematic structural diagram of a vehicle monitoring system provided in an embodiment of the present application.

An embodiment of the present application further provides a vehicle monitoring system, FIG. 5 is a schematic structural diagram of a vehicle monitoring system provided in an embodiment of the present application, and referring to FIG. 5, the vehicle monitoring system includes a light-filtering polarization angle calculation system 10, a polarization light-filtering system 20, and an imaging system 30.

The light-filtering polarization angle calculation system 10 is configured to calculate a polarization angle of polarized light in a sky image reflected by a vehicle window in a monitoring scenario, and calculate a light-filtering polarization angle according to the polarization angle of the polarized light in the sky image reflected by the vehicle window, where the polarized light in the sky image is formed by scattered sunlight in a sky region corresponding to the sky image. The polarization light-filtering system 20 is configured to filter out the polarized light in the sky image reflected by the vehicle window in the monitoring scenario according to the light-filtering polarization angle. The imaging system 30 is configured to image the monitoring scenario to form a monitoring image.

According to the vehicle monitoring system provided in the embodiment of the present application, the light-filtering polarization angle calculation system, the polarization light-filtering system and the imaging system are provided, the polarization angle of the polarized light in the sky image reflected by the vehicle window in the monitoring scenario is calculated and the light-filtering polarization angle according to the polarization angle of the polarized light in the sky image reflected by the vehicle window is calculated by the light-filtering polarization angle calculation system, then the polarized light in the sky image reflected by the vehicle window in the monitoring scenario is filtered out by the polarization light-filtering system according to the light-filtering polarization angle, and finally the monitoring scenario is imaged by the imaging system to form a monitoring image, so that the monitoring image including the vehicle may be effectively and clearly acquired. According to the embodiments of the present application, a condition that the monitoring system cannot eliminate the reflection of the vehicle window in the related art is avoided, the light reflected by the vehicle window is effectively filtered, and the interior of the vehicle may be effectively imaged, so that external and internal conditions of the vehicle can be monitored, and thus the comprehensive monitoring of the vehicle is ensured.

In order to ensure the filtering effect, optionally, the light-filtering polarization angle is perpendicular to the polarization angle of the polarized light in the sky image.

Figure 6:
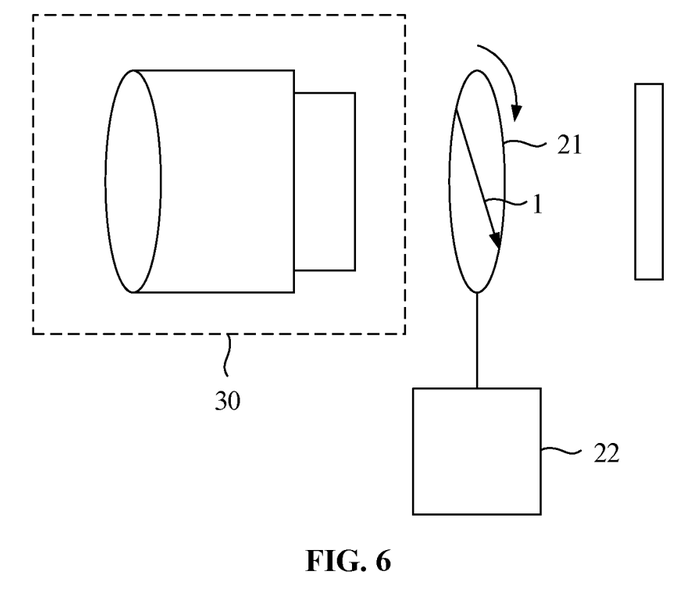
FIG. 6 is a schematic structural diagram of a polarization light-filtering system provided in an embodiment of the present application.

FIG. 6 is a schematic structural diagram of a polarization light-filtering system provided in an embodiment of the present application, and referring to FIG. 5 and FIG. 6, in the vehicle monitoring system provided in the above embodiments, the polarization light-filtering system 20 may include a polarizer 21 and a drive motor 22, and the drive motor 22 drives the polarizer 21 to adjust a transmission axis 1 of the polarizer 21 to the light-filtering polarization angle according to the light-filtering polarization angle calculated by the light-filtering polarization angle calculation system 10. The polarizer 21 may be disposed between a lens and an image sensor in the imaging system 30, and the polarizer 21 is configured to filter out polarized light in the sky image reflected by the vehicle window prior to imaging by the image sensor.

Figure 7:
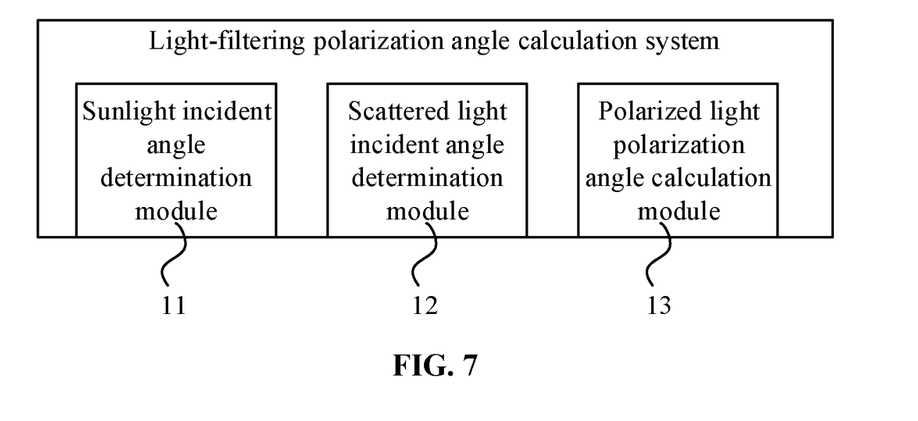
FIG. 7 is a schematic structural diagram of a light-filtering polarization angle calculation system provided in an embodiment of the present application.

FIG. 7 is a schematic structural diagram of a light-filtering polarization angle calculation system provided in an embodiment of the present application, and referring to FIG. 7, the light-filtering polarization angle calculation system 10 may include a sunlight incident angle determination module 11, a scattered light incident angle determination module 12, and a polarized light polarization angle calculation module 13. The sunlight incident angle determination module 11 is configured to determine an incident angle of sunlight. The scattered light incident angle determination module 12 is configured to determine an incident angle of scattered light formed in a sky region corresponding to a sky image. The polarized light polarization angle calculation module 13 is configured to calculate a polarization angle of polarized light formed by the scattered sunlight in the sky region corresponding to the sky image, and determine a polarization angle of polarized light in the sky image.

Exemplarily, the sunlight incident angle determination module 11 may include a clock system and a global positioning system. The clock system is configured to acquire current time. The global positioning system is configured to acquire a geographic position where a vehicle monitoring system is located. The sunlight incident angle determination module 11 may determine the incident angle of the sunlight according to pre-established mapping relations between a time parameter and the incident angle of the sunlight and between a geographic position parameter and the incident angle of the sunlight. The scattered light incident angle determination module 12 may include a vehicle recognition system and a global positioning system. The vehicle recognition system is configured to determine a pitch angle of the vehicle window. The global positioning system is configured to determine a direction angle of the vehicle window. The scattered light incident angle determination module 12 may determine the incident angle of the scattered light formed in the sky region corresponding to the sky image according to the pitch angle of the vehicle window, the direction angle of the vehicle window, and the like. Further, the polarized light polarization angle calculation module 13 may calculate the polarization angle of the scattered light, namely the polarization angle of the polarized light in the sky image is determined, by utilizing that a polarization direction of the scattered light (namely polarized light) formed in the sky region corresponding to the sky image is perpendicular to the incident direction of the sunlight and the propagation direction of the scattered light.

What is claimed is:

1. A vehicle monitoring method, comprising:
   calculating a polarization angle of polarized light in a sky image reflected by a vehicle window in a monitoring scenario, and calculating a light-filtering polarization angle according to the polarization angle of the polarized light in the sky image reflected by the vehicle window, wherein the polarized light in the sky image is formed by scattered sunlight in a sky region corresponding to the sky image;
   filtering out the polarized light in the sky image reflected by the vehicle window in the monitoring scenario according to the light-filtering polarization angle; and
   imaging the monitoring scenario to form a monitoring image.

2. The method of claim 1, wherein calculating the polarization angle of the polarized light in the sky image reflected by the vehicle window in the monitoring scenario comprises:
   determining an incident angle of the sunlight;
   determining an incident angle of scattered sunlight formed in the sky region corresponding to the sky image; and
   calculating a polarization angle of the polarized light formed by the scattered sunlight in the sky region corresponding to the sky image, and determining the polarization angle of the polarized light in the sky image.

3. The method of claim 2, wherein determining the incident angle of the sunlight comprises:
   acquiring current time;

acquiring a geographic position where a vehicle monitoring system is located; and determining the incident angle of the sunlight according to pre-established mapping relations between a time parameter and the incident angle of the sunlight and between a geographic position parameter and the incident angle of the sunlight.

4. The method of claim 2, wherein determining the incident angle of the scattered sunlight formed in the sky region corresponding to the sky image comprises:

determining a pitch angle of the vehicle window;

determining a direction angle of the vehicle window;

determining a position of a camera in a vehicle monitoring system relative to the vehicle window; and determining the incident angle of the scattered sunlight formed in the sky region corresponding to the sky image according to the pitch angle of the vehicle window, the direction angle of the vehicle window, and the position of the camera in the vehicle monitoring system relative to the vehicle window.

5. The method of claim 4, wherein determining the pitch angle of the vehicle window comprises:

acquiring an image of a vehicle;

recognizing a style of the vehicle according to the image of the vehicle; and determining the pitch angle of the vehicle window according to a pre-established mapping relation between the style of the vehicle and the pitch angle of the vehicle window.

6. The method of claim 4, wherein determining the direction angle of the vehicle window comprises:

acquiring an orientation of a road where a vehicle is located, and determining an orientation of the vehicle; and determining an azimuth angle of the vehicle window according to the orientation of the vehicle.

7. The method of claim 2, wherein determining the incident angle of the scattered sunlight formed in the sky region corresponding to the sky image comprises:

determining a pitch angle of the vehicle window;

determining a direction angle of the vehicle window;

determining an incident angle of scattered sunlight formed in a sky region directly opposite the vehicle window according to the pitch angle of the vehicle window and the direction angle of the vehicle window; and determining the incident angle of the scattered sunlight formed in the sky region directly opposite the vehicle window as the incident angle of the scattered sunlight formed in the sky region corresponding to the sky image.

8. The method of claim 7, wherein determining the pitch angle of the vehicle window comprises:

acquiring an image of a vehicle;

recognizing a style of the vehicle according to the image of the vehicle; and determining the pitch angle of the vehicle window according to a pre-established mapping relation between the style of the vehicle and the pitch angle of the vehicle window.

9. The method of claim 7, wherein determining the direction angle of the vehicle window comprises:

acquiring an orientation of a road where a vehicle is located, and determining an orientation of the vehicle; and determining an azimuth angle of the vehicle window according to the orientation of the vehicle.

10. The method of claim 7, wherein determining the pitch angle of the vehicle window comprises:

acquiring an image of a vehicle;

recognizing a style of the vehicle according to the image of the vehicle; and determining the pitch angle of the vehicle window according to a pre-established mapping relation between the style of the vehicle and the pitch angle of the vehicle window.

11. The method of claim 7, wherein determining the direction angle of the vehicle window comprises:

acquiring an orientation of a road where a vehicle is located, and determining an orientation of the vehicle; and determining an azimuth angle of the vehicle window according to the orientation of the vehicle.

12. The method of claim 1, wherein the light-filtering polarization angle is perpendicular to the polarization angle of the polarized light in the sky image.

13. A vehicle monitoring system, comprising:

a light-filtering polarization angle calculation system, which is configured to calculate a polarization angle of polarized light in a sky image reflected by a vehicle window in a monitoring scenario, and calculate a light-filtering polarization angle according to the polarization angle of the polarized light in the sky image reflected by the vehicle window, wherein the polarized light in the sky image is formed by scattered sunlight in a sky region corresponding to the sky image;

a polarization light-filtering system, which is configured to filter out the polarized light in the sky image reflected by the vehicle window in the monitoring scenario according to the light-filtering polarization angle; and an imaging system, which is configured to image the monitoring scenario to form a monitoring image.

14. The vehicle monitoring system of claim 11, wherein the polarization light-filtering system comprises a polarizer and a drive motor, wherein the drive motor drives the polarizer to adjust a transmission axis of the polarizer to the light-filtering polarization angle according to the light-filtering polarization angle calculated by the light-filtering polarization angle calculation system.

* * * * *